US012564742B2

(12) United States Patent
Schaer

(10) Patent No.: US 12,564,742 B2
(45) Date of Patent: Mar. 3, 2026

(54) INFLATABLE BAG, AVALANCHE BACKPACK AND METHOD OF DEFLATING AN INFLATABLE BAG

(71) Applicant: RAS Technology Sàrl, Lignières (CH)

(72) Inventor: Marc-Antoine Schaer, Lignières (CH)

(73) Assignee: RAS Technology Sàrl, Lignières (CH)

( * ) Notice: Subject to any disclaimer, the term of this patent is extended or adjusted under 35 U.S.C. 154(b) by 632 days.

(21) Appl. No.: 17/769,585

(22) PCT Filed: Sep. 10, 2020

(86) PCT No.: PCT/EP2020/075347

§ 371 (c)(1),
(2) Date: Apr. 15, 2022

(87) PCT Pub. No.: WO2021/078440

PCT Pub. Date: Apr. 29, 2021

(65) Prior Publication Data

US 2023/0131907 A1 Apr. 27, 2023

(30) Foreign Application Priority Data

Oct. 25, 2019 (EP) .................................... 19205227

(51) Int. Cl.
*A62B 33/00* (2006.01)
*A45F 3/04* (2006.01)
(Continued)

(52) U.S. Cl.
CPC ................ *A62B 33/00* (2013.01); *A45F 3/04* (2013.01); *B63C 9/00* (2013.01); *B63C 9/18* (2013.01);
(Continued)

(58) Field of Classification Search
CPC ... A62B 33/00; A45F 3/00; A45F 3/04; A45F 2003/001; A45F 2003/045; A63B 29/00;
(Continued)

(56) References Cited

U.S. PATENT DOCUMENTS

| | | | | |
|---|---|---|---|---|
| 7,270,077 | B2 * | 9/2007 | Beck | A62B 33/00 116/210 |
| 8,851,949 | B2 | 10/2014 | Grutta et al. | |
| 2007/0056500 | A1 | 3/2007 | Beck | |

FOREIGN PATENT DOCUMENTS

| | | | |
|---|---|---|---|
| EP | 2 548 619 | A2 | 1/2013 |
| EP | 2 604 318 | A2 | 6/2013 |

(Continued)

OTHER PUBLICATIONS

International Search Report Corresponding to PCT/EP2020/075347 mailed Oct. 22, 2020.

(Continued)

*Primary Examiner* — Lars A Olson
(74) *Attorney, Agent, or Firm* — Finch & Maloney PLLC

(57) ABSTRACT

The invention relates to an inflatable bag (60) with an inflation device (20), wherein the inflation device (20) comprises a first opening (22) adapted to allow the intake of a gas and a second opening (9) connected to the inflatable bag (60). The inflation device (20) further comprises a control (6) and an actuable valve (8) with an inlet opening (13) and an outlet opening (14), wherein the actuable valve (8) is controlled by the control (6) such as to open and close the actuable valve (8). The inlet of the actuable valve (8) is connected to the inflatable bag (60) such that it, when opened, creates a fluid communication channel between the inflatable bag (60) and the outlet (14) of the actuable valve (8) such as to allow deflation of the inflatable bag (60).

18 Claims, 10 Drawing Sheets

Figure 1:
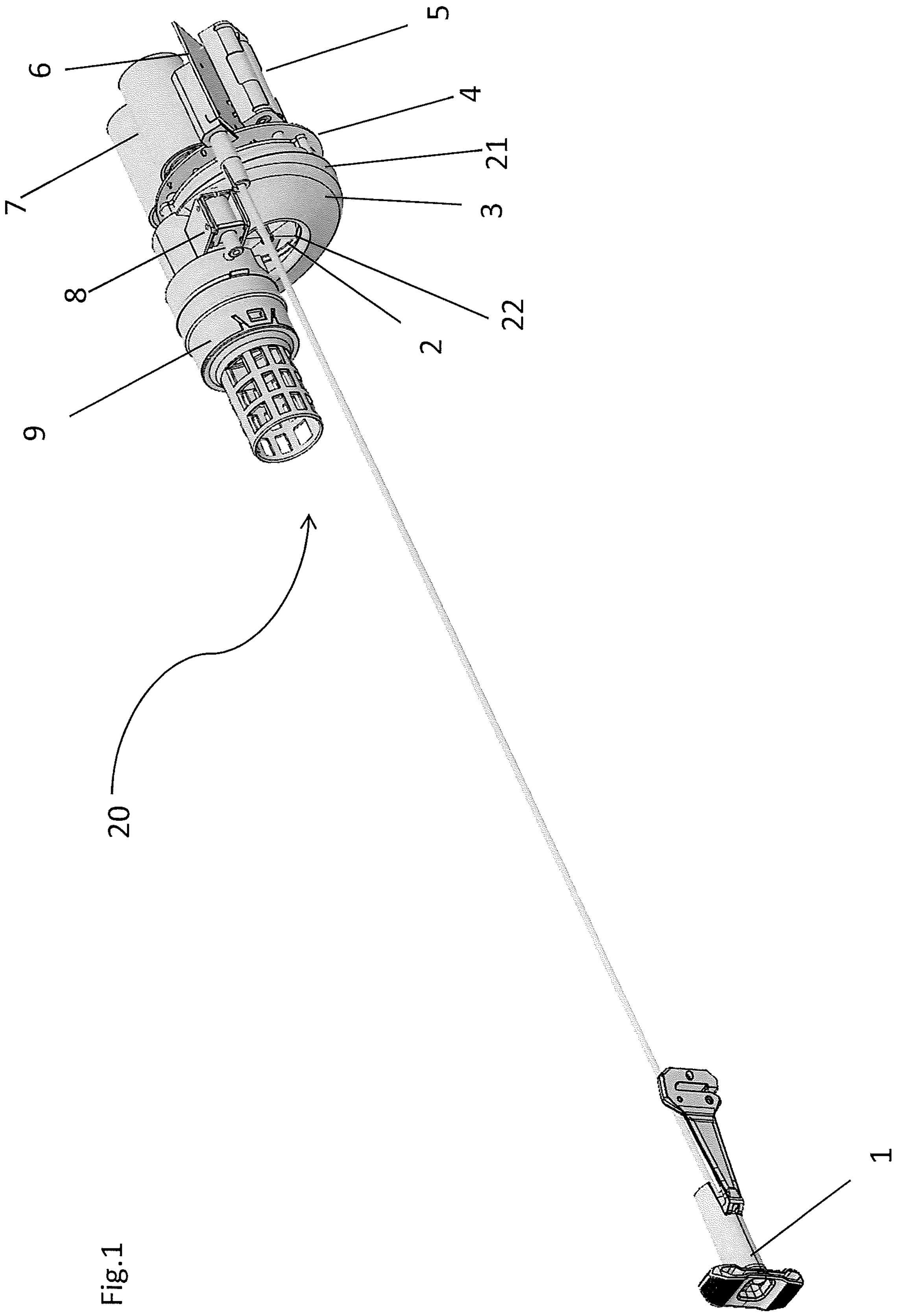

(51) Int. Cl.
*B63C 9/00* (2006.01)
*B63C 9/18* (2006.01)
*A45F 3/00* (2006.01)

(52) U.S. Cl.
CPC ... *A45F 2003/001* (2013.01); *A45F 2003/045* (2013.01)

(58) Field of Classification Search
CPC .. A63B 29/02; B63C 9/00; B63C 9/15; B63C 9/18; B64B 1/40
USPC ............................ 441/114, 80; 116/209, 210
See application file for complete search history.

(56) References Cited

FOREIGN PATENT DOCUMENTS

| | | | |
|---|---|---|---|
| EP | 3 045 207 | A1 | 7/2016 |
| EP | 3 202 462 | A1 | 8/2017 |
| EP | 2 961 491 | B1 | 5/2019 |
| WO | 2012/035422 | A1 | 3/2012 |

OTHER PUBLICATIONS

Written Opinion Corresponding to PCT/EP2020/075347 mailed Oct. 22, 2020.

* cited by examiner

INFLATABLE BAG, AVALANCHE BACKPACK AND METHOD OF DEFLATING AN INFLATABLE BAG

The present invention relates to an inflatable bag, an avalanche backpack and a method for deflating an inflatable bag according to the preamble of the independent claims.

It is known in the art to inflate an inflatable bag, for example an avalanche airbag, to protect a person from being buried underneath an avalanche.

Many known devices use compressed-gas cartridges to inflate the inflatable bag. For example, EP 2 961 491 and EP 2 548 619 disclose such devices.

However, it is also known to use electrical inflation devices. For example, WO 2012/035422 A1 discloses an airbag system based on an electric motor and a battery. EP 3 202 462 similarly discloses avalanche airbags using an electric motor for powering an inflation device, however using supercapacitors instead of batteries to power the motor.

EP 2 604 318 further discloses an inflatable avalanche safety system using a fan to inflate an inflatable chamber, wherein the fan is further used to actively deflate the inflatable chamber by moving the air out of the inflatable chamber. Deflating an airbag after deployment can present several advantages such as reduced wear and tear of the airbag material, providing space under the snow for an avalanche victim, and providing air for breathing for the victim.

The known systems present several drawbacks. In many systems there is no possibility for easy deflation. Automatic deflation of known airbags is only possible with the help of additional equipment such as a fan. Evidently, such systems require electrical power to deflate an airbag and are thus more expensive, heavier, and more prone to failure.

Thus, the object of the present invention is to overcome the drawbacks of the prior art, in particular to provide an inflatable bag with a deflation mechanism that is economical, reliable, and easy to use.

This and other objects are achieved by the inflatable bag, the backpack and the method according to the characterizing portion of the independent claims of the invention.

The inflatable bag according to the invention is preferably an avalanche airbag. It comprises an inflation device. The inflation device comprises a first opening adapted to allow the intake of a gas, in particular atmospheric air and/or a compressed gas. The inflation device further comprises a second opening connected to the inflatable bag. The inflation device comprises an actuable valve with an inlet opening and an outlet opening. The actuable valve is controlled by a control such as to allow to open and close the actuable valve. The control can in particular be an electronic control. It may comprise electronic circuitry such as microchips. Alternatively, however, it is also conceivable to use a mechanic control, for example comprising a timer, or a manual trigger. The inlet of the actuable valve is in fluid communication with the inflatable bag such that actuable valve, when opened, creates a fluid communication channel between the interior volume of the inflatable bag and the outlet of the actuable valve such as to allow deflation of the inflatable bag.

In particular, such an arrangement allows for a defined opening of a valve such as to deflate the inflatable bag.

In particular, the outlet of the actuable valve may open into an ambient environment. Additionally or alternatively, it may also open into the first opening such as to bypass an impeller, a fan, or a one-way valve, or it may open toward a region where, when used as intended by a user, a user's head would be located to provide air for breathing.

It is possible to arrange the actuable valve as part of the inflation device. For example, the actuable valve may be in fluid communication with an air path of the inflation device to allow for deflation when opened. Alternatively, it is also possible to arrange the valve separately from the inflation device. For example, the inflatable bag may comprise an opening for connection to the actuable valve.

The deflation of the inflatable bag creates space around the head of a victim that has been buried by an avalanche. This provides air to breathe, space to move and also distance between the snow and the skin which slows down the cooling of the victim.

In addition, the deflation reduces the time that the inflatable bag is under pressure and thus reduces wear and tear and increases its lifetime. Thus, such an inflatable bag is also more reliable.

In the inflated state, the inflatable bag typically has an internal pressure of 50 to 150 mbar and a volume of 100 to 200 liter, preferably 140 to 160 liters, even more preferably 150 liters.

Preferably, the actuable valve is solenoid valve. This enables the actuation by an electronic control, for example applying a voltage to the valve. In particular, the solenoid valve may be adapted to actuated by a DC current of 1.5 to 5V, preferably 2.5 to 3.5 V, particularly preferably 3 V. A particularly suited actuable valve is the model "AJK-F0507" produced by Xiamen AJK Technology Co. Ltd.

A solenoid valve is further advantageous as the flow of electricity can heat the valve. The heating induced by the normal operation of the valve may thus prevent and/or reduce formation of ice and malfunction of the valve due to freezing.

Alternatively, other systems to open and close a fluid communication channel may also be employed, for example linear actuators.

Additionally or alternatively, the actuable valve may have a default state. A default state shall be understood as an open or closed state which the valve is in without actuation. Particularly preferably, the default state is closed. For example, a solenoid valve as described above which can be actuated by a voltage of 3 V could have a default state in which the valve is closed. Thus, if no voltage is applied, the valve would be closed. A default state in which the actuable valve is closed, i.e. if the actuable valve is normally off and closed, provides additional safety as the risk of accidental deflation is reduced. For example, even a failure and/or malfunction of the electrical system would not necessarily lead to an opening of the actuable valve.

If the default state is closed, the valve may be electrically operable to be opened. As such, a solenoid valve may heat up due to the operation with electricity and prevent and/or reduce malfunctions of the device due to freezing, for example due to clogging of the valve channel with ice particles.

Preferably, the inflatable bag comprises a one-way valve arranged between the first and the second opening such as to only allow flow of gas in the direction from the first to the second opening and into the bag.

Such a one-way valve ensures that the inflatable bag is efficiently inflated while preventing air from flowing out of the inflatable bag during inflation and once inflated. Thus, the inflatable bag remains in its inflated state. A one-way valve shall be understood as a valve that is, in particular, non-actuable, meaning that it permanently allows flow of a fluid in one direction while preventing flow of a fluid in the other. For example, this may be achieved by a spring mechanism that automatically closes the one-way valve unless it is pushed open by pressure gradient.

Preferably, the inlet of the actuable valve is connected to an air path of the inflation device upstream of the one-way valve. Upstream shall be understood as the direction from the first to the second opening, i.e. the direction of airflow during inflation.

Particularly preferably, the actuable valve is arranged on the inflation device or configured as a part of the inflation device. Thus, the actuable valve may not be attached to moving parts and/or mechanically flexible parts such as an inflatable bag. Such an arrangement or configuration is particularly advantageous as it provides additional safety, for example a reduced risk of damage to the actuable valve.

Preferably, the inflatable bag comprises a movable inflation member, in particular an impeller. The inflation member is arranged between the first and the second opening, a motor being in operable connection with the inflation member and adapted to drive the inflation member. The inflatable bag further comprises an energy source for energizing the motor, in particular a capacitor.

Such inflation members are disclosed in EP 3 202 462.

In particular, the control may also control the motor and the inflation of the inflatable bag, in particular based on a manual triggering of a manual trigger by a user.

Alternatively, the inflatable bag comprises a mechanism to open a compressed gas cartridge and an opening connectable to a compressed gas cartridge. The opening that is connectable to a compressed gas cartridge may be the first opening, or a separate opening. In particular, the inflation device may comprise an opening connectable to a compressed gas cartridge and another opening for intake of atmospheric air, wherein the flow of the compressed gas causes a depression that leads to a draw-in of atmospheric air (Venturi-effect).

Preferably, the actuable valve comprises a mechanism that maintains the actuable valve closed unless it is opened by the control. Particularly preferably, the mechanism may be a mechanical spring. Such a mechanism enable the implementation of a default state as described above.

In particular, such a mechanism may additionally function as an overpressure valve. The mechanism may be adapted, for example by dimensioning a spring accordingly, to open the actuable valve if a certain pressure is reached within the inflatable bag. Thus, tearing of the inflatable bag may be prevented if a sudden increase in pressure arises in the inflatable bag (for example from impact or snow load).

Preferably, the control is adapted to automatically open the actuable valve at a pre-determined time after the inflation device has inflated the inflatable bag. The control may be adapted to detect that the inflatable bag has been inflated by the detection of a manual trigger, for example the by user that deploys an airbag. Additionally or alternatively, it may be triggered by a detection of a pressure increase in the inflatable bag, or by a mechanical detection, for example of the inflation of the inflatable bag.

For example, the valve may automatically open after a certain time has lapsed after inflation. Additionally or alternatively, other parameters may be used by the control to trigger deflation. For example, it would be conceivable to use sensors to determine parameters such as pressure, position, orientation, and others to determine whether or not the inflatable bag shall be deflated. Similarly, a manual mechanism may also be used to either trigger deflation or to start a delay time after which deflation will automatically occur.

Particularly preferably, the control is adapted to open the actuable valve between 1 min and 5 min, particularly preferably between 2 min and 4 min, even more preferably 3 min, after the inflation device has inflated the inflatable bag. These values have proven particularly advantageous in that they are long enough to keep the inflatable bag inflated as long as an avalanche is in motion such as to protect a user, while deflating in time for a user to provide, for example, space and breathing air. However, it would also be possible to adapt the control such that deflation takes place after less than a minute or after more than 5 min depending on the desired application.

Preferably, the inflation device is adapted such that the opening of the actuable valve causes deflation, which leads to a reduction in volume of 5% to 70%, preferably 10% to 50%, even more preferably one of 20% to 30%, 30% to 40%, and 40% to 50%.

In some embodiments, the actuable valve may be adapted and/or controlled such as to release an overpressure in the inflatable bag while substantially avoiding a reduction in volume of the inflatable bag.

A release of the overpressure may increase the lifetime of an inflatable bag due to reduced wear and tear of fabric, stitches, seams, and sealing parts. Thus, such an overpressure release may enable a safe use of an inflation device and/or an inflatable bag for a larger number of inflation cycles compared to devices without overpressure release. It will be understood that similar advantages may arise even if the volume is reduced, i.e. if further deflation is carried out after the release of an overpressure.

In turn, the increased lifetime allows for increased practice inflation, test inflation, and/or trainings. Particularly preferably, the inflatable bag with an inflation device according to the invention is adapted to be deployed at least 50 times.

In particular, the crosssection of the actuable valve and/or of the fluid communication channel formed in its open state may be adapted in size to achieve such a deflation and reduction in volume. Additionally or alternatively, the inflatable bag may comprise materials with mechanical properties adapted to tune the reduction in volume. For example, a material with a higher stiffness may lead to a lower reduction in volume. A more elastic material, by contrast, may lead to a higher reduction in volume.

Particularly preferably, the actuable valve and/or the fluid communication channel formed in its open state may have a diameter of 3-4 mm, preferably about 3.5 mm.

A small diameter, in particular of 3.5 mm, is large enough to allow for some deflation, for example sufficient to create a void space in snow such that an avalanche victim can move the head. However, such a hole may be too small for further deflation after an overpressure is released.

It will be understood, however, that such an adaptation of the material may be particularly advantageous but not necessary for a deflation to occur. In particular, the deflation may also be driven by a pressure applied to the airbag by snow, a user's head, or another body part.

Preferably, the inflation device does not comprise any active deflation mechanism.

In particular, the deflation and reduction in volume may be achieved passively, i.e. merely by opening of the actuable valve and the flow of air caused by the overpressure in the inflated inflatable bag. This is enables a sufficient deflation to achieve to advantages described herein without necessitating additional parts or equipment or power supply that would make such a device heavy and expensive.

The invention is further directed to an inflatable bag with an inflation device comprising a first opening, a second opening, a motor, an electric power source, and a radial fan. The inflatable bag may be an inflatable bag as described herein. The motor is powered by the electric power source and adapted to drive the radial fan. The inflatable bag further comprises an air path arranged between the radial fan the second opening. According to the invention, the air path is arranged at least partially parallel to a rotation axis of the radial fan.

The second opening is in particular adapted for air to be blown out of the inflation device during operation and may thus be attachable or attached to the inflatable bag.

In particular, the air path may be arranged parallel to a rotation axis of the radial fan in an area adjacent to the second opening.

In particular, portions of the air path in regions of the first and second openings may be arranged in an at least partially parallel manner.

Particularly preferably, the air path comprises a portion that extends at least partially circumferentially about the rotation axis of the radial fan.

In a particularly preferred embodiment, the inflation device comprises an outer housing and an inner housing. The fan may be arranged within the inner housing, whose shape substantially corresponds to the shape of the solid of revolution of the fan. The inner housing may be further configured to comprise or be in fluid communication with the first opening, wherein said first opening is preferably arranged along the rotation axis of the fan. The inner housing may also comprise an air deflector arranged at a circumference of the fan. An gap may be formed directly adjacent to the air deflector and/or at the circumference of the fan, preferably oriented in a plane perpendicular to the rotation axis of the fan. The outer housing may form an air path that evolves circularly around the rotation axis of the fan and preferably around the first opening. The gap may form a fluid communication channel between the air path and a volume inside the inner housing. The air path may have a crosssectional area along a plane perpendicular the air flow direction that increases in the rotation direction of the fan in its intended use, i.e. when the fan rotates in such a way that the air is sucked in through the first opening and pushed from the inner housing through the gap into the air path. Thus, the air path has an at least partially spiral shape. It may, in particular, have a flat and/or rotation-symmetric base surface that is preferably formed at least partially by the adjacent outer surface of the inner housing, while an upper surface of the air path, which is formed by the outer housing, extends spirally around the rotation axis of the fan. In particular, the air path may be arranged such that a centroid curve of the air path extends in a spiral around the rotation axis of the fan. The air path may have a snail-like shape. The air path typically extends around the rotation axis of the fan in one full circle, i.e. it extends around the rotation axis in an angular range of substantially 360°. At the end of the air path (in a downstream direction of the air flow in its intended use as defined herein), a second opening is arranged. The second opening is preferably linear and arranged in parallel to the rotation axis of the fan. It may also be arranged at least partially in parallel to the first opening. Typically, the first and the second opening are additionally laterally displaced, i.e. they are not collinear.

This arrangement of an air path allows for a particularly compact size of the inflation device as the openings for inflow and outflow of atmospheric air as well as the inflatable bag can be arranged along the rotation axis of the radial fan.

Preferably, the air path is at least partially laterally displaced to the rotation axis of the radial fan. In particular, the air path may be laterally displaced to the rotation axis of the radial fan in the area in which it is parallel to said rotation axis.

The laterally displaced portion of the air path may be arranged in the region of the second opening and the inflatable bag.

The lateral displacement, in particular such that the said portion of the air path is arranged at a peripheral position of the radial fan, enables a particularly advantageous construction of the inflation device where the radial fan is oriented in a plane perpendicular to the direction of air inflow and outflow, while keeping the length of the air path short.

Preferably, the inflation device further comprises an air deflector. The air deflector enables a deflection the air flow from a direction perpendicular to the rotation axis of the radial fan in a direction parallel to said rotation axis.

The invention is further directed at an avalanche backpack comprising an inflatable bag and an opening for the intake of atmospheric air, wherein the inflatable bag is arranged such that, in an inflated state, the inflatable bag extends outside of the avalanche backpack in a pre-determined fixed position. The inflatable bag is an inflatable bag as described herein. The avalanche backpack further comprises a manual trigger arranged on the outside of the backpack which is in operable connection with the inflatable bag.

The invention is further directed at a method of deflating an inflatable bag. Preferably, the method is performed with an inflatable bag as described herein. The method comprises the steps of:

- Determining whether a deflation criterion has been fulfilled, in particular measuring a time lapse since an inflation of the inflatable bag and determining if the time lapse is greater than a pre-defined delay time,
- If the criterion is fulfilled, in particular if a pre-defined delay time has lapsed, opening an actuable valve, in particular a solenoid valve, such as to create a fluid communication channel between the inside and the outside of the inflatable bag,
- passively deflating the inflatable bag.

Passive deflation shall be understood as deflation substantially only driven by the pressure inside the inflatable bag.

In the following, the invention is described in detail with reference to the following figures, showing:

FIG. 1: an inflation device according to the invention.

Figure 2:
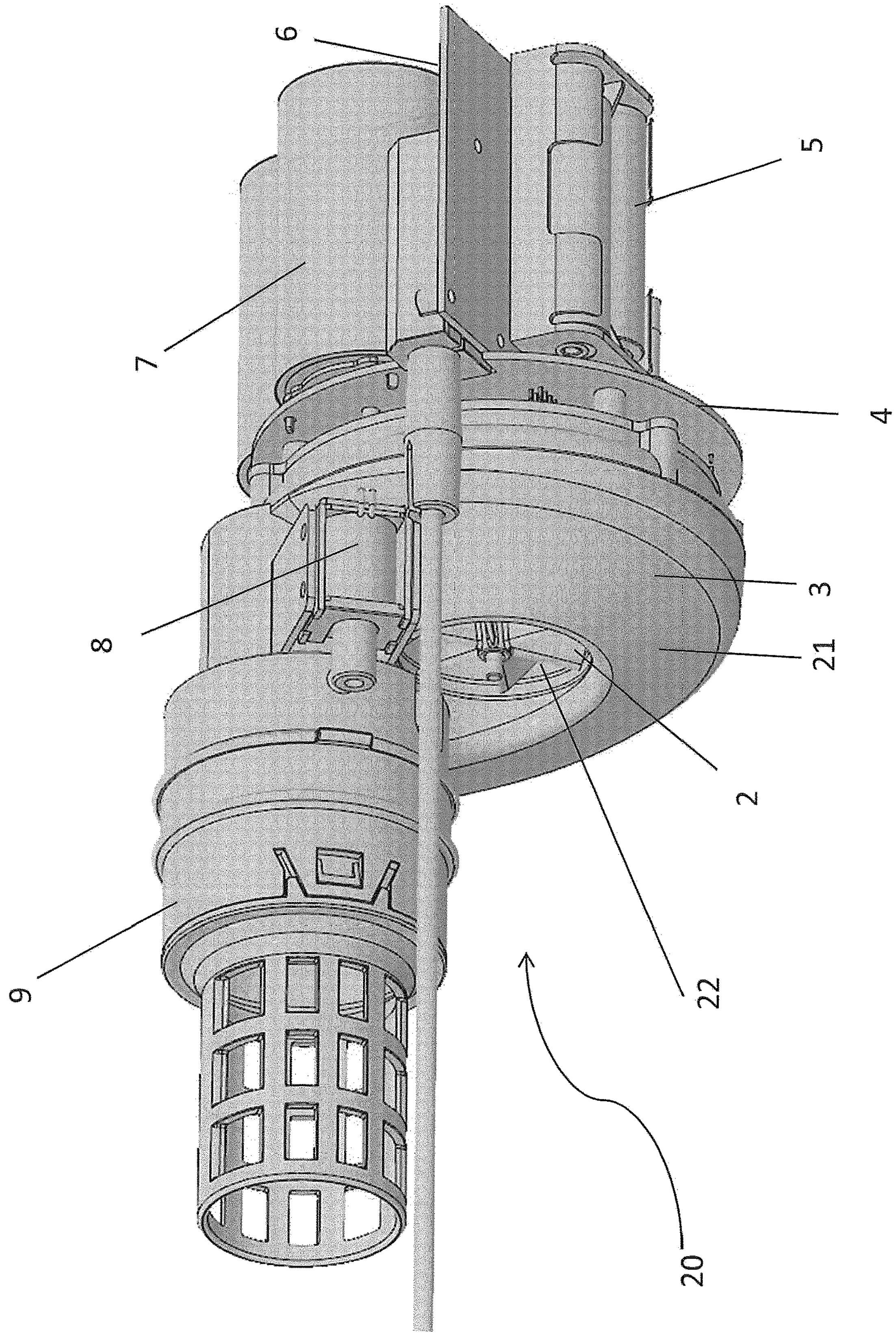

FIG. 2: the inflation device of FIG. 1 in a detailed side perspective.

Figure 3:
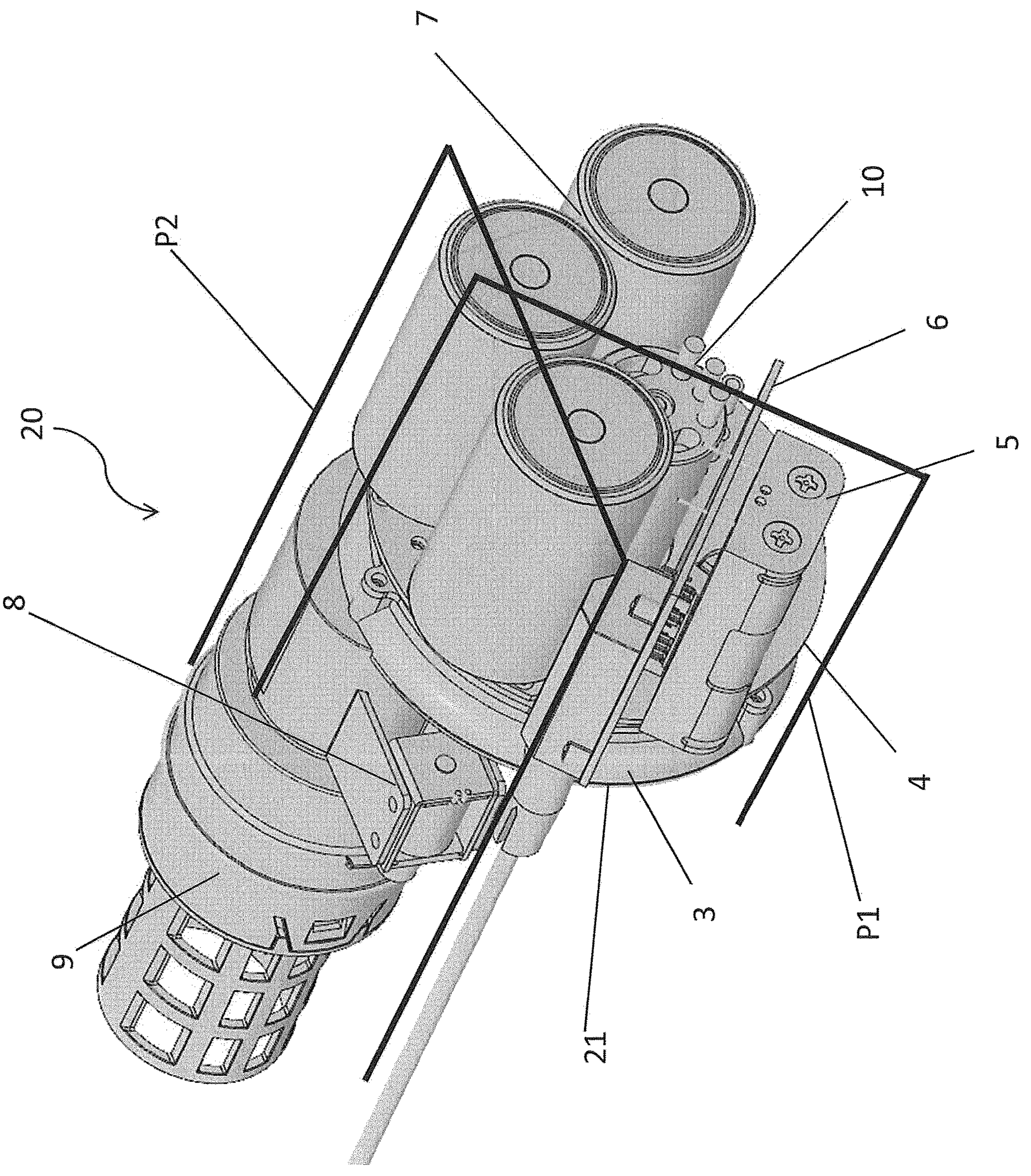

FIG. 3: the inflation device of FIG. 2 in a back perspective.

Figure 4:
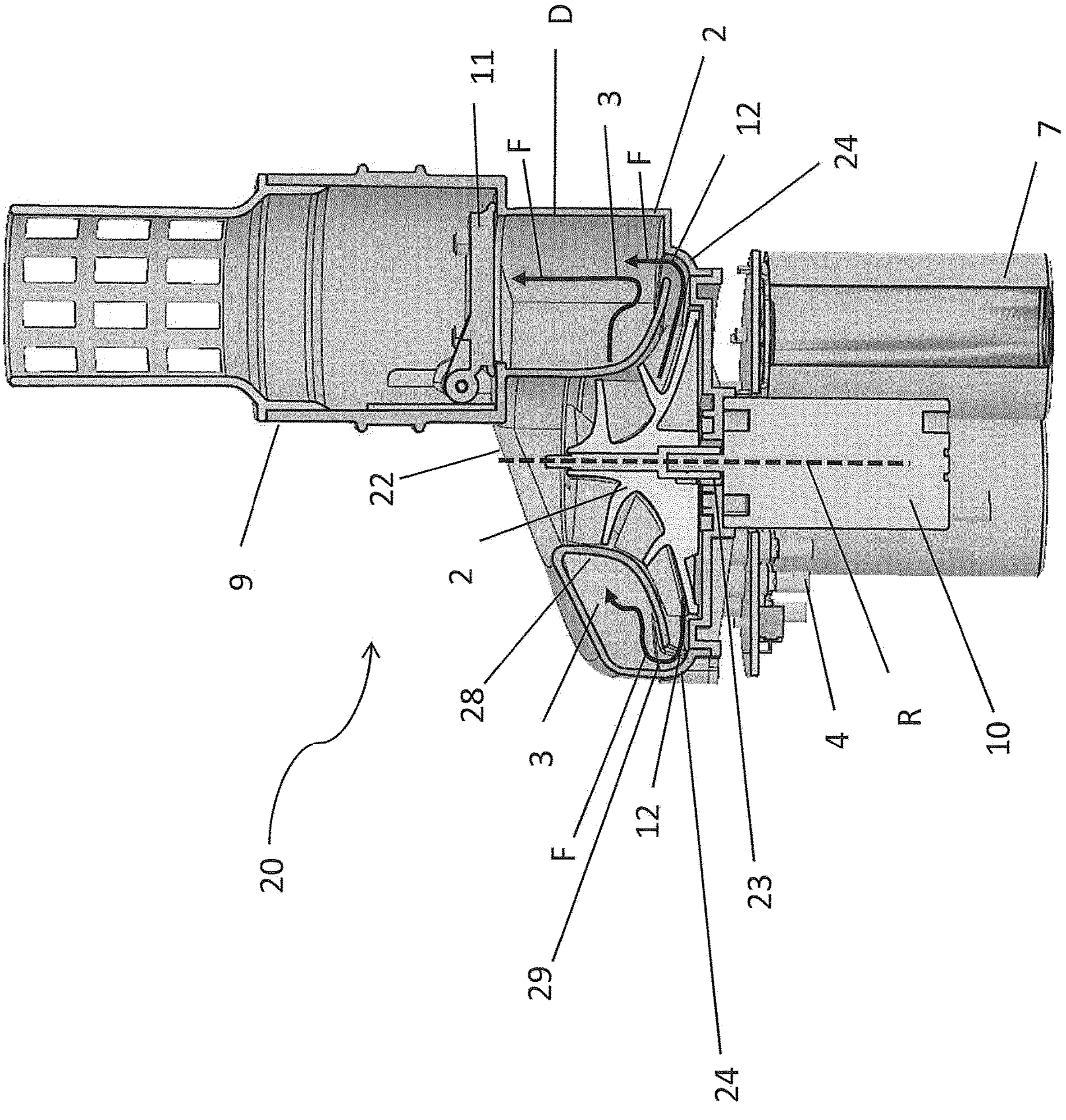

FIG. 4: a cross-sectional view of the inflation device of FIG. 3 along plane P1.

Figure 5:
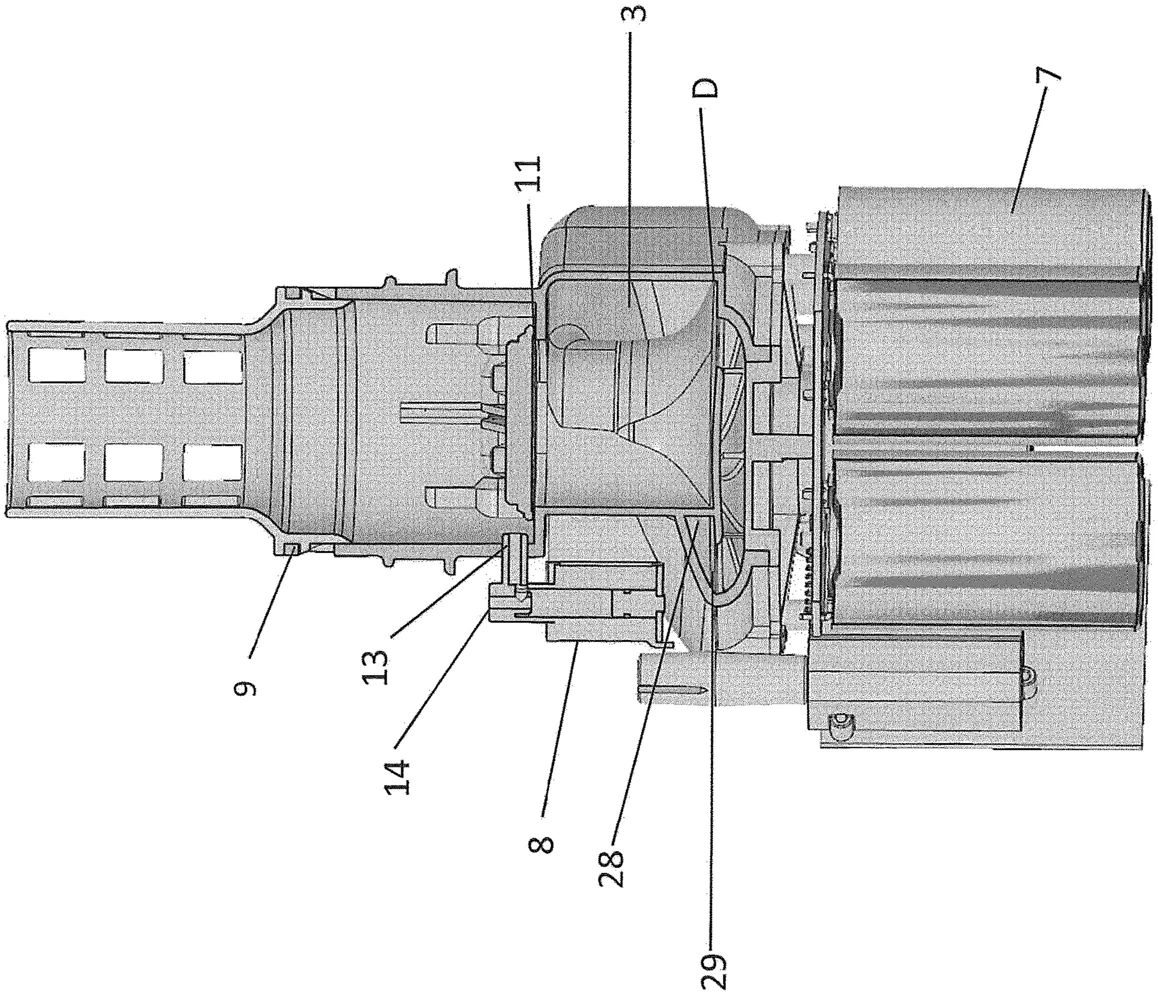

FIG. 5: a cross-sectional view of the inflation device of FIG. 3 along plane P2.

Figure 6B:
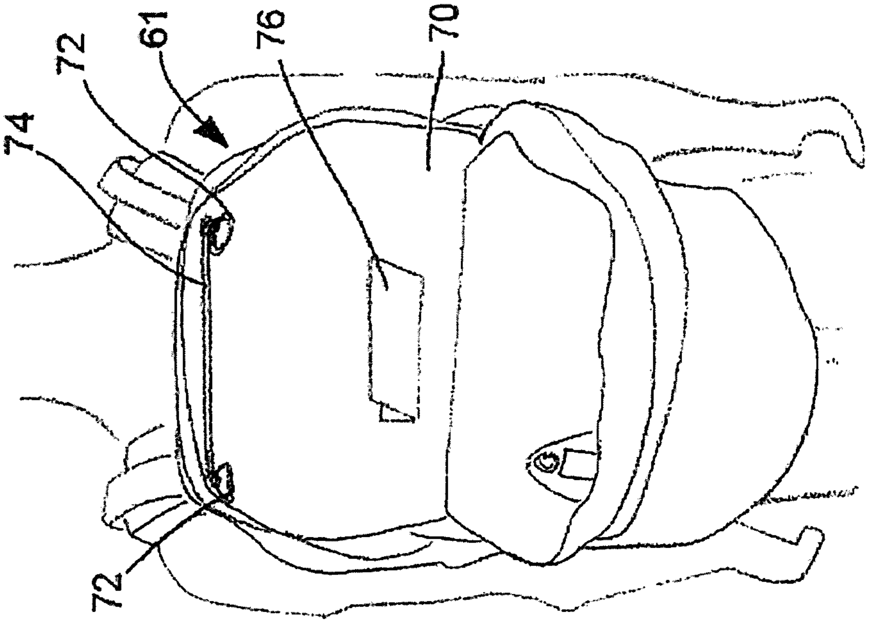
Figure 6A:
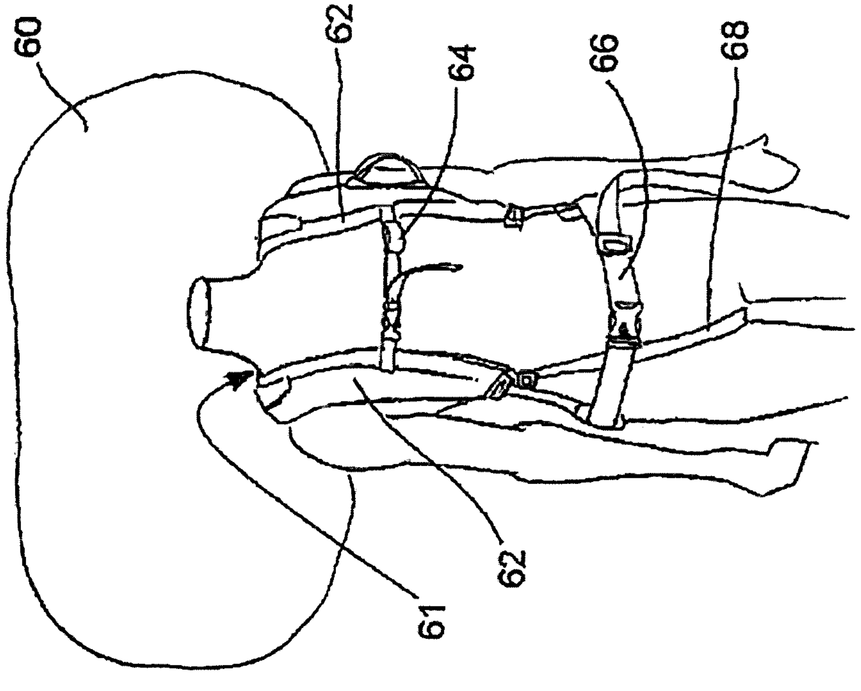

FIG. 6*a*+6*b*: a backpack comprising an inflatable bag in a deflated and inflated state.

Figure 7:
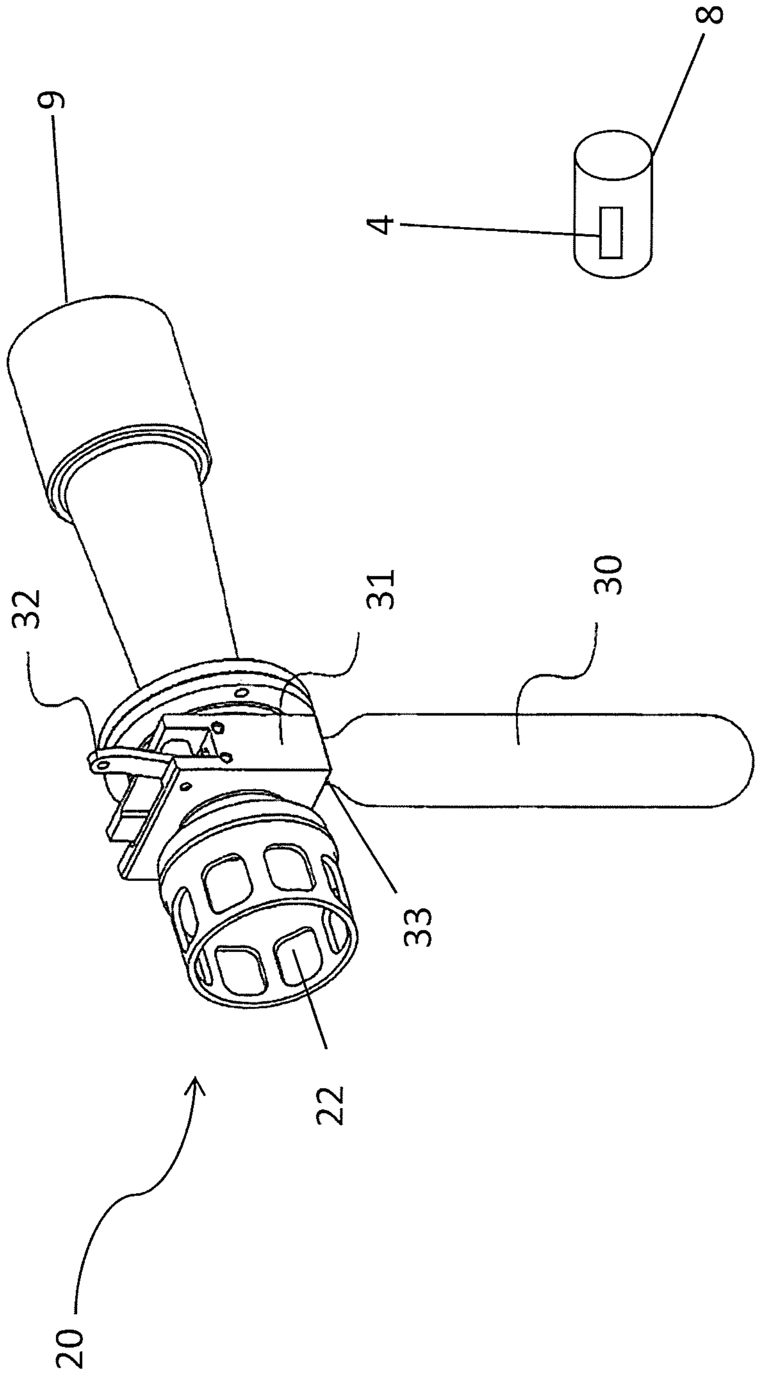

FIG. 7: an alternative inflation device according to the invention.

Figure 8B:
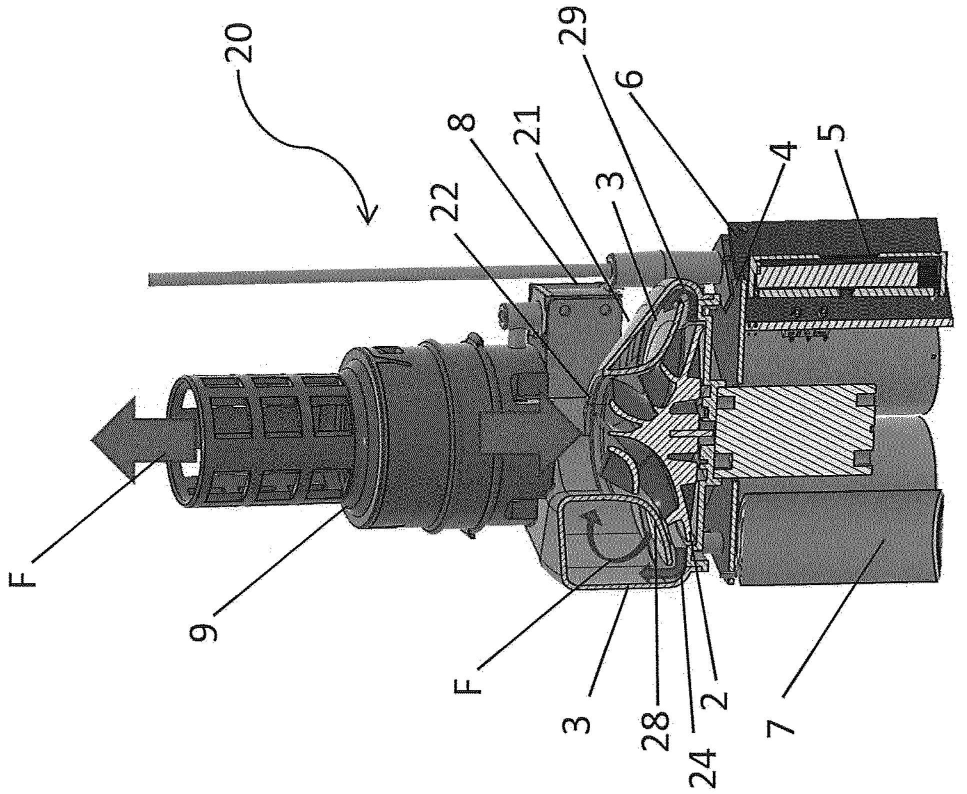
Figure 8A:
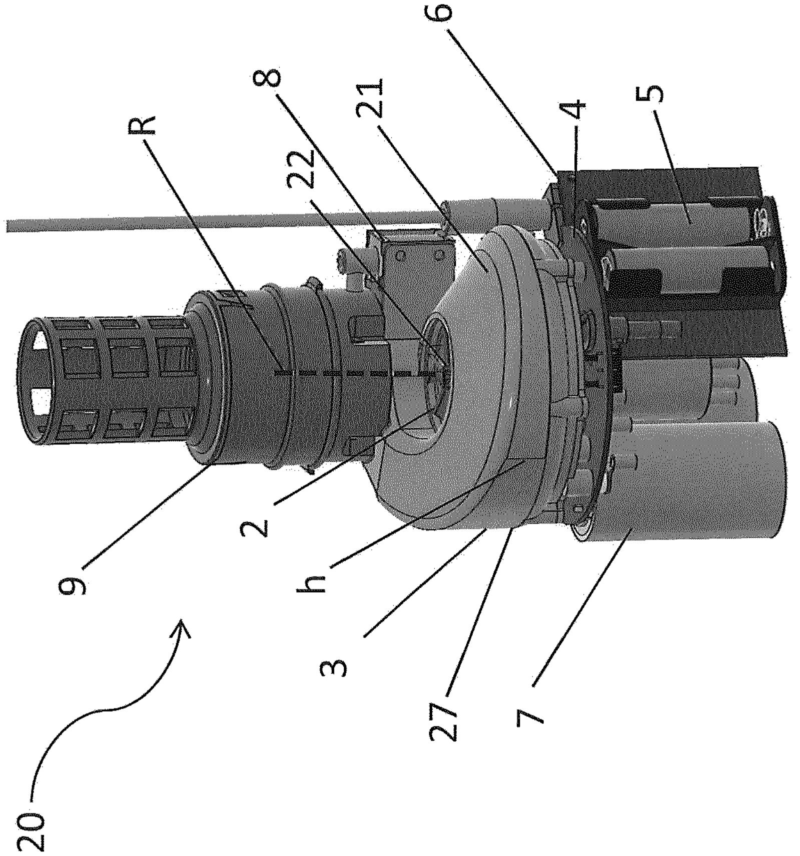

FIG. 8*a*+8*b*: a side view and a partial crosssection of the inflation device of FIGS. 1 to 5 along a longitudinal axis.

Figure 9B:
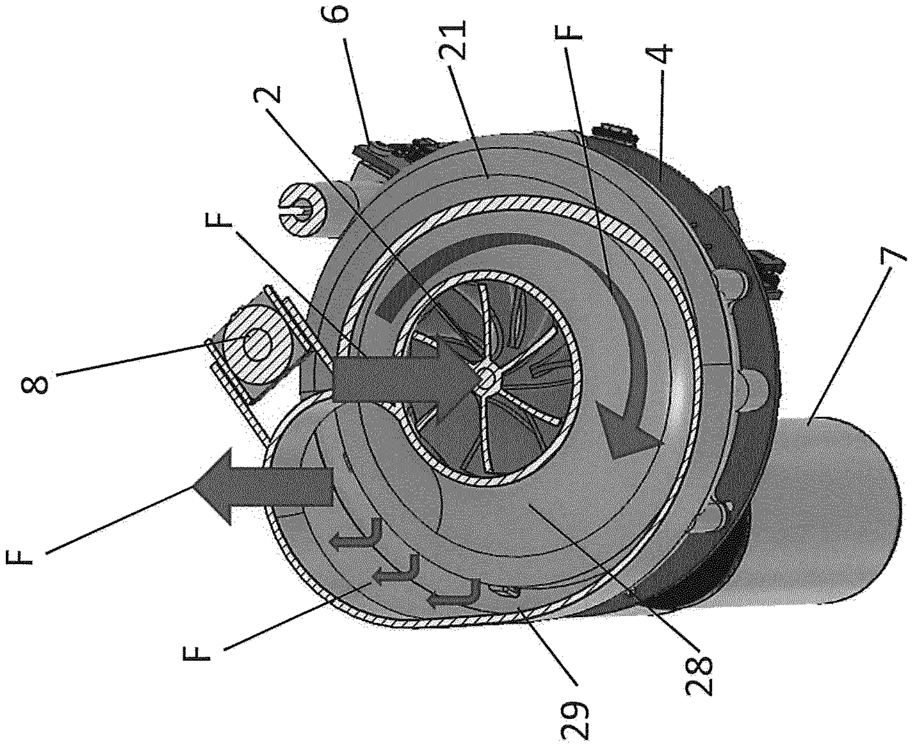
Figure 9A:
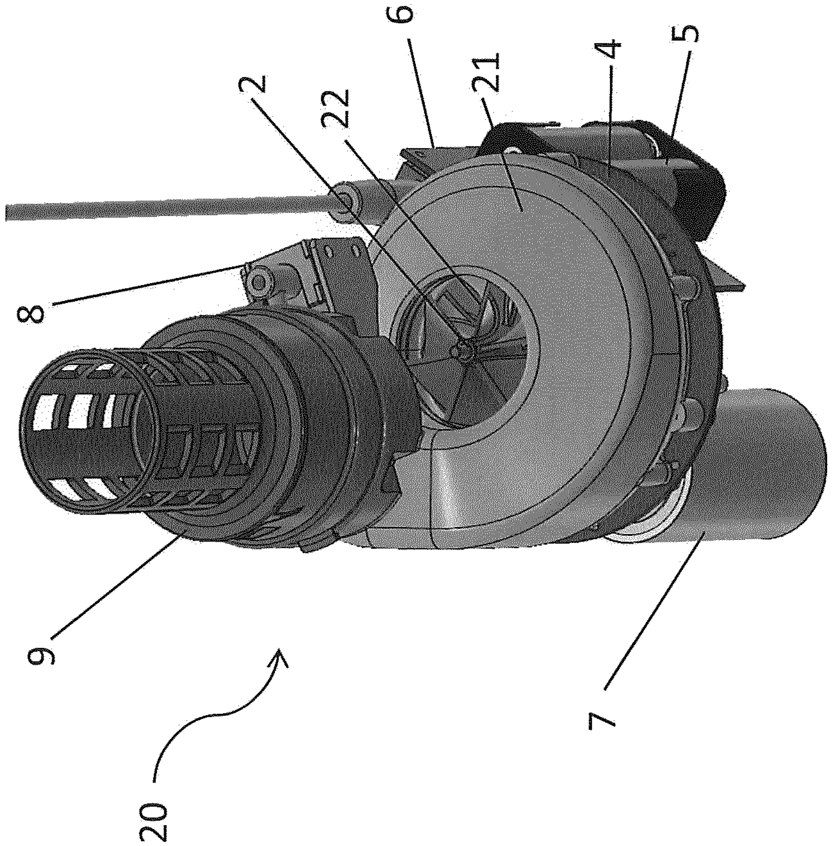

FIG. 9*a*+9*b*: a side view and a crosssection of the inflation device of FIGS. 1 to 5 along a plane perpendicular to the longitudinal axis.

Figure 10B:
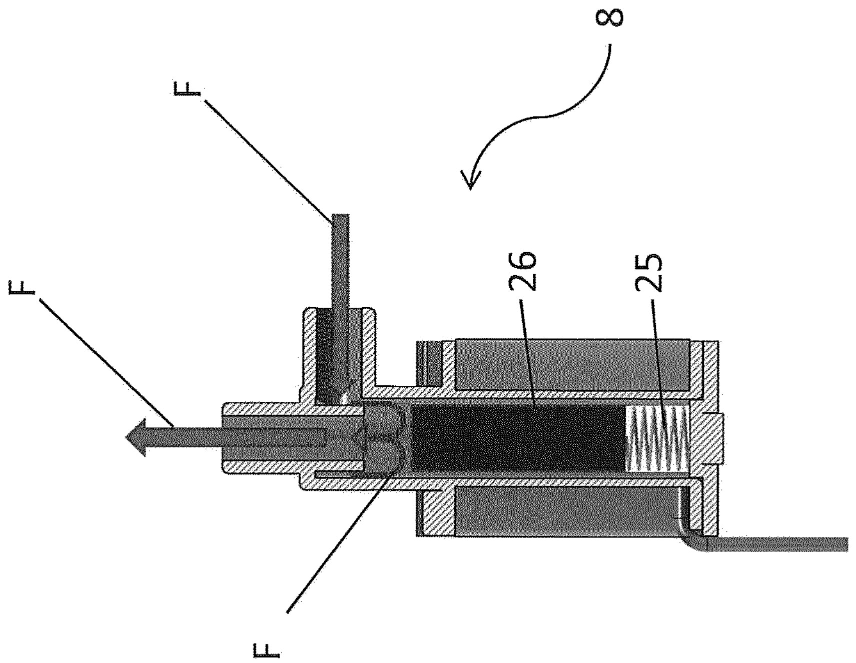
Figure 10A:
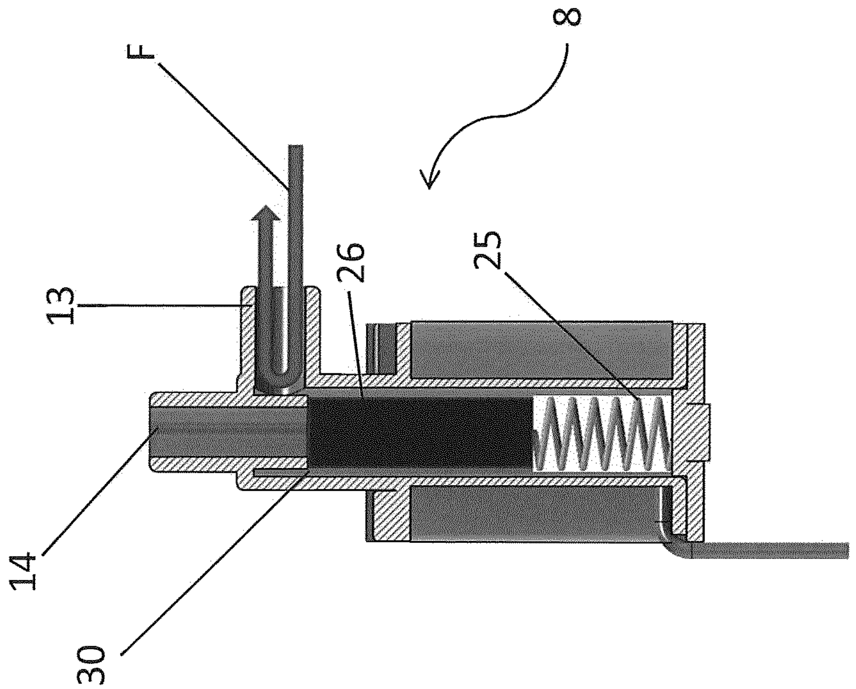

FIG. 10*a*+10*b*: a crosssectional view of an actuable valve in a closed and an open position.

FIG. 1 shows an inflation device 20 according to the invention. The device 20 has a manual trigger 1 to activate the inflation device such as to inflate an inflatable bag (not shown). The device 20 has a second opening 9 which is adapted to be connected to an inflatable bag. The device in the shown embodiment comprises supercapacitors 7 that power a motor 10 (see FIG. 3). Here, three supercapacitors 7 are arranged as a capacitor 7 module and connected in series. Alternatively, any other number of capacitors 7, in particular six, could be used. The capacitors 7 are arranged and fixedly attached on a printed circuit board 6 in the capacitor module. Upon pulling of the manual trigger 1, a control 4 causes the motor to drive a radial fan 2 at a rotational speed of approximately 40,000 rpm inside a housing 21 which draws air in through a first opening 22 and pushes it back out through the second opening 9 via an air path 3.

The radial fan 2 has diameter of 65 mm and has 12 blades. The radial fan may have a diameter of 30 to 105 mm, particularly preferably 50 to 80 mm, even more preferably 60 to 70 mm. The diameters of the first opening 22 and second opening 9 may be in the range of 20 to 60 mm, preferably 35 mm.

The second opening 9 is adapted to be connected to an inflatable bag (not shown) and thus, when in operation, the inflation device 20 inflates an inflatable bag.

The device 20 further comprises an actuable valve 8, here in the form of a solenoid valve. The valve 8 is arranged at the air path 3 of the inflation device upstream of a one-way valve 11 (see FIGS. 4 and 5). A logical circuitry board 6 is adapted such as to control the actuable valve 8. Power control 4 controls the power supplied from the supercapacitors 7 to the motor (not shown). Board 6 and control 4 may be implemented on the same circuitry or may be separate components which are preferably in operative connection. The control 6 is adapted to detect when the inflation device 20 starts inflating an inflatable bag and to measure the lapsed time from that point. After 3 min, the control 6 opens the solenoid valve 8 such as to create a fluid communication channel between the air path 3 in a region upstream of the one-way valve 11 and an atmosphere external of the inflation device 20. The inflation device 20 further comprises batteries 5 as a power supply. For example, they can be used to recharge the supercapacitors 7 after an operation cycle of the inflation device 20. They are also used to power the electronics 4, 6 and the solenoid valve 8. Preferably, the batteries are two standard AA/LR6 batteries providing a voltage of 1.5 V.

The capacitor module 7 may have a total capacitance in the range of 80 to 150, preferably 110 F to 150 F, more preferably 120 F. In may be made up of individual capacitors 7 in a serial mode, in particular of three capacitors 7 with a capacity of 360 F each.

The voltage of the capacitor module 7 may be 6 to 12 V, preferably 8 to 10 V, particularly preferably 9 V. In particular, the capacitor module 7 may be made up of three individual capacitors 7 with a voltage of 3 V each in serial mode.

The maximum continuous current of the capacitor 7 may be in the range of 80 to 140 A; the maximum peak current of the capacitor 7 may be 300 A.

Typically, three capacitors 7 of a total capacitance of about 250 to 450 F each, preferably 390 F, at a voltage of 3 V (corresponding to an energy of 0.5 Wh) may be used to form a total capacitance of 130 F. By way of example, the capacitor module may be a super- or ultra-capacitor module such as the "MaxWell 16V 58F ultra capacitor module". Other standard capacitor modules may be equally used in the device 20.

The motor 10 is preferably a brushless motor that can reach rotation speeds in the range of 20,000 to 60,000 rpm, preferably 30,000 to 50,000 rpm, even more preferably 35,000 to 45,000. The voltage of the motor may be in the range of 4 to 10 V at a maximum current of 140 A, resulting in a maximum power of approximately 1300 W. The motor may attain a RPM/V value of 9750 KV.

FIG. 2 shows the inflation device 20 of FIG. 1 in a close-up side view.

FIG. 3 shows the inflation device 20 of FIGS. 1 and 2 in a rear view. On the back of the inflation device 20, the motor 10 is arranged. The three supercapacitors 7 are arranged along the circumference of the motor 10 which his particularly space saving. It would also be conceivable to arrange the parts differently to adapt the overall shape of the inflation device for a particular application.

FIG. 4 shows a cross-sectional view of the inflation device 20 of FIGS. 1-3 along the plane P1 shown in FIG. 3. The motor 10 is operably connected to the radial fan 2 via a coupling 23 such that the motor can drive the radial fan 2. When in operation, the radial fan 2 draws air in from the first opening 22. The radial fan 2 pushes the air in a radial direction toward an air guidance channel 21, where a portion of the housing 21 is arranged as an air deflector 24 and deflects the air such that it enters an air path 3. The air path is arranged circumferentially around a rotation axis R of the radial fan 2. The direction of air flow is indicated by arrows F. The cross-sectional area of the air path 3 increases in a clock-wise direction when viewed from the first opening 22 along the rotation axis R. A portion D of the air path 3 is arranged parallel and laterally displaced to the rotation axis R of the radial fan 2. Adjacent to the portion D of the air path, a one-way valve 11 is arranged that prevents gas from flowing from the second opening 9 back into the air path 3 formed by the housing 21. However, gas may be transmitted from the air path 3 to the second opening 9, in particular when the radial fan 2 is in operation. The radial fan 2 is therefore arranged between the first opening 22 and the second opening 9 along the direction of flow of the air in the inflation device 20.

FIG. 5 shows a cross-sectional view of the inflation device of the previous figures along the plane P2 shown in FIG. 3. The solenoid valve 8 is arranged upstream of the one-way valve 11 and opens the air path 3 through an inlet opening 13. The solenoid valve further comprises an outlet opening 14 that opens into an atmosphere external of the inflation device.

FIG. 6*a* illustrates the inflated inflatable bag 60 when attached to a backpack 61 having conventional shoulder straps 62, as well as a chest strap 64, a hip belt 66 and a leg strap 68 that secures the backpack better on its wearer. The inflatable bag in its inflated state extends outside of the backpack in a pre-determined position such that that it protects the user's head.

FIG. 6*b* illustrates a pocket 70 of a backpack 61 that is intended to house the folded inflatable bag. The pocket 70 is closed by a zip-fastener in the shown embodiment. The zip-fastened pocket 70 can be opened by an inflating inflatable bag 60. Actuation of the manual trigger 1 causes inflation of the inflatable bag 60 and thus the release the inflatable bag 60 from the pocket 70. The pocket comprises, by way of non-limiting illustration, two D-rings 72 the relative distance between which is kept fixed by a reinforcing bar 74. Moreover, a first piece 76 of Velcro (registered trademark) is arranged in the pocket 70 and intended to collaborate with a second piece of Velcro (not shown) secured to the airbag 60.

FIG. 7 shows an alternative inflation device 20 with a first opening 22 and a second opening 9. In addition, the inflation device 20 comprises an additional opening 33 to be connected to a compressed gas cartridge 30. A trigger mechanism 32 is adapted to pierce the compressed gas cartridge 30, upon which the compressed gas flow towards the second opening 9. The flow of the compressed gas causes a depression and atmospheric air to be drawn in through the first opening 22. The second opening 9 is adapted to be connected to an inflatable bag. The inflation device 20 comprises a separately disposed actuable valve 8 with an integrated control 4 and power supply that opens the actuable valve 8 after 3 min have passed since the inflation of the inflatable bag 60. The actuable valve 8 is configured as a separate part to be attached to the inflatable bag 60 via a separate opening. The control 4 detects when the inflatable bag is inflated via a pressure sensor (not shown). It will be understood that such a separately disposed valve 8 and control 4 could also be used in combination with another embodiment of the inflation device, namely with one comprising a radial fan. Conversely, an actuable valve as shown in the context of other embodiments of the inflation device, namely one that is in fluid communication with the second opening 9, may be used with the inflation device of FIG. 7.

FIG. 8*a* shows a side view of the inflation device 20 of FIGS. 1 to 5. The housing 21 is partially spiral-shaped. A side wall 27 of the housing 21 extends around the circumference of the fan 2 and the housing 21. Its height h measured along the rotation axis R increases continually in a clockwise direction toward the second opening 9.

FIG. 8*b* shows the inflation device 20 of FIG. 8*a* in a partially crosssectional view along a longitudinal axis. The air path 3 has a larger crosssectional area on the left side of the device (from the perspective shown here) than on the right side due to the partially spiral-shaped housing 21 and the increasing height of the side wall 27. Air can enter through the first opening 22 and is pushed in a radial direction by the fan 2. A gap 29 is formed along the circumference of the fan 2 between the side wall 27 and an inner wall 28. The air is pushed in a radial direction by the fan 2 and deflected by the air deflector 24 through the gap 29. The gap 29 creates a fluid communication path between the air path 3 and the first opening 22 and the fan 2. The air thus flows into the air path 3 in response to movement of the fan 2. The air flows within the air path 3 in a clockwise direction. Because air is pushed into the air path 3 along substantially the entire circumference of the fan, the volume of air that flows within the air path 3 increases in a clockwise direction along the circumference of the fan toward the second opening 9. The correspondingly increasing crosssectional area of the air path 3 prevents large pressure gradients that may otherwise slow down or even prevent air flow in the intended direction of flow F.

FIG. 9*a* shows the inflation device of FIGS. 8*a* and 8*b* from an elevated perspective.

FIG. 9*b* shows a crosssectional view of the inflation device of FIG. 9*a* along a plane perpendicular to the rotation axis R of the fan 2. The gap 29 formed between the housing 21 and the inner wall 28 is arranged along the circumference of the fan 2. The air path 3 has crosssectional area that increases in a clockwise direction and along the flow of air F.

FIG. 10*a* shows a solenoid valve 8 in a closed state. The valve 8 comprises a spring 25 and a piston 26. Without any actuation, the spring pushes the piston against the wall of the outlet opening 14. The inlet opening 13 is in fluid communication with a chamber housing the piston 25 and the spring 26. Therefore, the pressure in the area of the spring 25 and the piston 26 is identical with the pressure in the inlet opening 13 and, when connected to an inflatable bag 60, with the pressure inside the inflatable bag 60.

FIG. 10*b* shows the solenoid valve 8 of FIG. 10*a* in an open state. Actuation, in this case by means of a magnetic force, compresses the spring 25 and moves the piston 26 in a downward direction away from the outlet opening 14. This creates a fluid communication channel between the inlet opening 13 and the outlet opening 14, thus enabling airflow F between the two.

The invention claimed is:

1. A system comprising an inflatable bag and an inflation device, wherein the inflation device is attached to the inflation bag, the inflation device comprising a first opening adapted to allow the intake of a gas, a second opening connected to the inflatable bag, and a control, wherein the inflation device comprises an actuable valve with an inlet opening and an outlet opening, wherein the actuable valve is arranged on the inflation device or configured as part of the inflation device, and is controlled by the control to open and close the actuable valve, further wherein the actuable valve comprises a mechanism that maintains the actuable valve closed unless it is opened by the control, wherein the actuable valve has a default state, in which the actuable valve is without actuation, said default state being closed, the inlet of the actuable valve being in fluid communication with the inflatable bag such that the actuable valve, when opened, creates a fluid communication channel between an interior volume of the inflatable bag and the outlet of the actuable valve to allow passive deflation of the inflatable bag, wherein a one-way valve is arranged between the first opening and the second opening to only allow flow of gas in a direction of the first opening to the second opening and into the inflatable bag to allow inflation, wherein the inlet of the actuable valve is connected to an air path of the inflation device upstream of the one-way valve.

2. The system according to claim 1, wherein the actuable valve is a solenoid valve.

3. The system according to claim 1, further comprising a movable inflation member arranged between the first opening and the second opening, a motor being in operable connection with the inflation member and adapted to drive the inflation member, and an energy source for energizing the motor.

4. The system according to claim 1, further comprising a mechanism to open a compressed gas cartridge and an opening connectable to a compressed gas cartridge.

5. The system according to claim 1, wherein the actuable valve comprises a mechanism that maintains the actuable valve closed unless it is opened by the control.

6. The system according to claim 1, wherein the control is adapted to automatically open the actuable valve at a pre-determined time after the inflation device has inflated the inflatable bag.

7. The system according to claim 6, wherein the control is adapted to open the actuable valve between 1 min and 5 min after the inflation device has inflated the inflatable bag.

8. The system according to claim 1, wherein the inflation device is adapted such that the opening of the actuable valve causes a deflation, leading to a reduction in volume of 5% to 70%.

9. The system according to claim 1 comprising a first opening, a second opening, a motor, an electric power source, and a radial fan, wherein the motor is powered by the electric power source and adapted to drive the radial fan, further comprising an air path arranged between the radial fan and the second opening, wherein the air path is arranged at least partially parallel to a rotation axis of the radial fan.

10. The system according to claim 9, wherein the air path is at least partially laterally displaced to the rotation axis of the radial fan.

11. The system according to claim 9, wherein the inflation device further comprises an air deflector.

12. An avalanche backpack comprising an inflatable bag and an opening for the intake of atmospheric air, wherein the inflatable bag is arranged such that, in an inflated state, the inflatable bag extends outside of the avalanche backpack in a pre-determined fixed position, characterized in that the inflatable bag is an inflatable bag according to claim 1.

13. An avalanche backpack comprising an inflatable bag and an opening for the intake of atmospheric air, wherein the inflatable bag is arranged such that, in an inflated state, the inflatable bag extends outside of the avalanche backpack in a pre-determined fixed position, characterized in that the inflatable bag is an inflatable bag according to claim 9.

14. A method of deflating an inflatable bag of a system according to claim 1, comprising the steps of:

determining whether a deflation criterion has been fulfilled, and determining if a time lapse is greater than a pre-defined delay time;

If the criterion is fulfilled, opening an actuable valve to create a fluid communication channel between the inside and the outside of the inflatable bag; and passively deflating the inflatable bag.

15. The system according to claim 1, wherein the actuable valve is not attached to moving parts and/or mechanically flexible parts of the inflatable bag.

16. The system according to claim 1, wherein a one-way valve arranged between the first and the second opening only allow flow of gas in the direction from the first to the second opening and into the bag.

17. The system according to claim 1, wherein the mechanism is a mechanical spring.

18. The system according to claim 1, wherein the mechanism is separate from an actuation mechanism.

* * * * *